US010909515B2

(12) United States Patent
Canfield et al.

(10) Patent No.: US 10,909,515 B2
(45) Date of Patent: Feb. 2, 2021

(54) SYSTEMS AND METHODS FOR USE IN TRACKING USAGE OF ASSETS BASED ON SENSORS ASSOCIATED WITH THE ASSETS

(71) Applicant: MASTERCARD INTERNATIONAL INCORPORATED, Purchase, NY (US)

(72) Inventors: Eric Canfield, New York, NY (US); Stephane Wyper, Weehawken, NJ (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 948 days.

(21) Appl. No.: 15/583,816

(22) Filed: May 1, 2017

(65) Prior Publication Data

US 2018/0315032 A1    Nov. 1, 2018

(51) Int. Cl.
*G06Q 20/14* (2012.01)
*G06Q 20/40* (2012.01)
(Continued)

(52) U.S. Cl.
CPC ............. *G06Q 20/145* (2013.01); *G01V 3/08* (2013.01); *G01V 8/10* (2013.01); *G06Q 10/087* (2013.01);
(Continued)

(58) Field of Classification Search
CPC ........ G06Q 10/00; G06Q 20/00; G06Q 30/00; G06Q 40/00
(Continued)

(56) References Cited

U.S. PATENT DOCUMENTS 6,988,087 B2 * 1/2006 Kanai .................... G06Q 30/02
                                                                    705/80
7,912,759 B2 * 3/2011 Wolinsky ........... G06Q 30/0633
                                                                    705/14.73

(Continued)

OTHER PUBLICATIONS

Parkison et al., Evaluating positivist theories of occupant satisfaction: a statistical analysis, Building Research & Information, vol. 46, No. 4, pp. 430-443 (Year: 2018).*

(Continued)

*Primary Examiner* — Frantzy Poinvil
(74) *Attorney, Agent, or Firm* — Harness, Dickey & Pierce, P.L.C.

(57) ABSTRACT

Systems and methods are provided for assessing one or more fees in connection with occupancy of a user at a shared office environment. One exemplary method includes receiving, from a sensor associated with a workstation, confirmation of a presence of a user at the workstation, and receiving, from the sensor, an occupancy interval based on the presence of the user at the workstation up to a departure of the user from the workstation. The method also includes, in response to receiving the occupancy interval, determining a fee associated with occupancy of the workstation by the user, based on at least the occupancy interval, and initiating a transaction to a payment account associated with the user for the determined fee, thereby providing payment specific to the occupancy of the workstation by the user substantially upon the departure of the user from the workstation.

17 Claims, 3 Drawing Sheets

(51) Int. Cl.
*G06Q 30/02* (2012.01)
*G01V 8/10* (2006.01)
*G01V 3/08* (2006.01)
*G06Q 30/06* (2012.01)
*G06Q 10/08* (2012.01)
*G06Q 20/32* (2012.01)
*G06Q 20/20* (2012.01)
*G06Q 30/04* (2012.01)

(52) U.S. Cl.
CPC ....... *G06Q 20/203* (2013.01); *G06Q 20/3224* (2013.01); *G06Q 20/40* (2013.01); *G06Q 30/0284* (2013.01); *G06Q 30/04* (2013.01); *G06Q 30/06* (2013.01)

(58) Field of Classification Search
USPC ...................................... 705/3–44
See application file for complete search history.

(56) References Cited

U.S. PATENT DOCUMENTS

| | | | | |
|---|---|---|---|---|
| 7,917,450 B1* | 3/2011 | Musuvathy | ............ | G06Q 10/06 705/400 |
| 8,064,487 B1* | 11/2011 | Armstrong | ........ | H04M 3/42365 370/259 |
| 8,315,913 B2* | 11/2012 | Wolinsky | ........... | G06Q 30/0248 705/26.1 |
| 8,831,287 B2* | 9/2014 | Dasu | ..................... | G06T 7/0008 348/143 |
| 9,852,388 B1* | 12/2017 | Swieter | .................... | H04Q 9/00 |
| 2006/0015375 A1* | 1/2006 | Lee | ........................ | G06Q 10/02 705/5 |
| 2009/0273441 A1* | 11/2009 | Mukherjee | ........... | A47C 31/126 340/5.82 |
| 2010/0179861 A1* | 7/2010 | Teerilahti | ........... | G06Q 30/0278 705/7.33 |
| 2013/0081479 A1* | 4/2013 | Miller | .................... | G16H 50/20 73/862.53 |
| 2013/0311361 A1* | 11/2013 | Boss | ....................... | G06Q 40/12 705/39 |
| 2014/0122346 A1* | 5/2014 | O'Brien | ............. | G06Q 30/0645 705/307 |
| 2015/0009332 A1* | 1/2015 | Fuhrmann | ................ | G07C 9/00 348/155 |
| 2015/0120360 A1* | 4/2015 | Adriaenssens | .......... | G01V 8/10 705/7.16 |
| 2015/0120365 A1* | 4/2015 | Walker | ................ | G06Q 50/165 705/7.23 |
| 2015/0379435 A1* | 12/2015 | Johnson | ................ | G06Q 10/02 705/5 |
| 2019/0034851 A1* | 1/2019 | Swieter | .................... | H04Q 9/00 |

OTHER PUBLICATIONS https://www.cobot.me/guides/credit-cards-&-direct-debit; Credit cards and direct debit; accessed Apr. 13, 2017, 14 pgs.

* cited by examiner

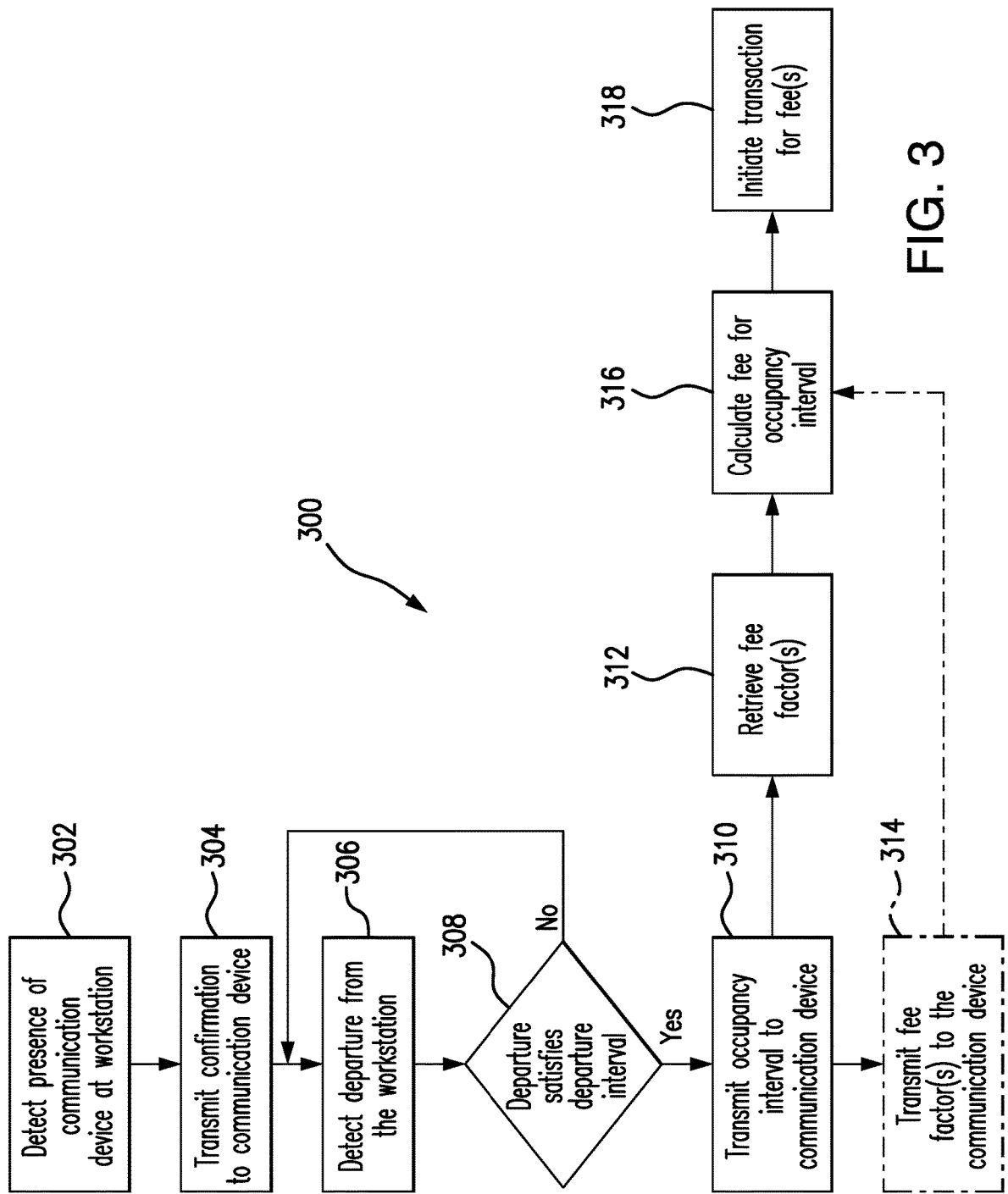

SYSTEMS AND METHODS FOR USE IN TRACKING USAGE OF ASSETS BASED ON SENSORS ASSOCIATED WITH THE ASSETS

FIELD

The present disclosure generally relates to systems and methods for use in tracking usage of assets based on sensors associated with the assets, and in particular, for use in detecting such use of the assets and users associated with use of the assets (e.g., in connection with shared office workstations, etc.) and in facilitating transactions for fees associated with the use of the assets.

BACKGROUND

This section provides background information related to the present disclosure which is not necessarily prior art.

Persons are known to perform work tasks, in connection with their employment by employers, at workstations (e.g., desks, etc.) in offices owned and operated by the employers. The employers incur substantial expense to provide the workstations and offices for the persons, often with each person assigned to a designated workstation for that person's sole use. For a given person, an amount of time spent at the office varies depending on, for example, travel away from the office, types of tasks performed, collaboration with other persons, etc. The amount of time at the office, by the person, impacts the value the employer receives for the cost incurred. More recently, employers have adopted different forms of "hot-desking," where workstations are allocated to workers only when they are required, rather than giving each worker sole use of their own workstation. In one application, the allocation may be based on scheduling the workstations, or based on first come-first serve allocation. In another application, often referred to as hoteling, a workstation is allocated to a person on a short term basis (e.g., for a day, a week, etc.). In any case, each of these forms of hot-desking is designed to reduce a number of workstations for the employer (and, potentially, the required office space to house such workstations), thereby raising value for the employer for the cost incurred for the given workstations (i.e., reducing unused workstations, while still fulfilling workstation needs).

In addition, some employers (especially small employers) and/or independent business persons have opted to utilize shared office space, which is based on a fee paid, rather than any affiliation with an employer. In such cases, the workstations, and associated office more generally, are equipped with general office furniture and amenities (e.g., copiers, phones, fax machines, IT services, receptionists, security, etc.). This technique is sometimes referred to as a "serviced office." In this scheme, the person or employer effectively rents the workstation(s) for a given period, often after registering, reserving the workstation, and paying a monthly fee associated with the shared office space (e.g., by monthly invoices, etc.).

DRAWINGS

The drawings described herein are for illustrative purposes only of selected embodiments and not all possible implementations, and are not intended to limit the scope of the present disclosure.

FIG. 3 is a flow diagram of an exemplary method, which may be implemented in connection with the system of FIG. 1, for assessing fees to a user for use of a workstation at a shared office environment.

Corresponding reference numerals indicate corresponding parts throughout the several views of the drawings.

DETAILED DESCRIPTION

Exemplary embodiments will now be described more fully with reference to the accompanying drawings. The description and specific examples included herein are intended for purposes of illustration only and are not intended to limit the scope of the present disclosure.

When workstations (broadly, assets) are offered in a shared office environment, users of the workstations may be charged for use thereof and for other amenities offered at the shared office environment. Often, the charges are associated with subscriptions and/or memberships of the users to the shared office environment for one or more defined intervals, where the charges are then levied regardless of the users actually utilizing the assets, or not.

Uniquely, the systems and methods herein permit fees to be determined for use of assets (e.g., occupancy of workstations at shared office environments, etc.) based on the actual use of the assets, rather than on general intervals that may or may not be related to such actual use. In particular herein, for example, a workstation (broadly, an asset) may be equipped with a sensor, which detects a user and, specifically, a communication device associated with the user, when the user is present at the workstation. The sensor and/or an application included in the communication device then determine an occupancy interval for the user at the workstation, and initiate a transaction for fees associated with the occupancy interval when the user departs the workstation (and/or departs a shared office environment associated with the workstation). In this manner, the user is only charged for the time that he/she occupies the workstation (broadly, for his/her use of the asset), rather than more generally for a subscription and/or membership to the workstation (during which the user may not continually use the workstation). In addition, because a transaction may be initiated upon the user's departure, fees are charged and/or collected substantially in real time, thereby providing revenue for the workstation (e.g., to the shared office environment associated therewith, etc.) consistent with actual occupancy of the workstation (and, potentially, occupancy of the shared office environment as a whole). What's more, when fees are determined at the time of, or just after, the user's departure, the fees actually charged to the user may further be determined (or adjusted) based on the overall occupancy of the workstations at the shared office environment (e.g., based on current demand for workstations at the shared office environment while the user is present at the workstation, based on historical occupancy at certain times and/or days, etc.), whereby fees may be increased and/or decreased to account for the occupancy and/or expected occupancy of the workstations, etc.

Figure 1:
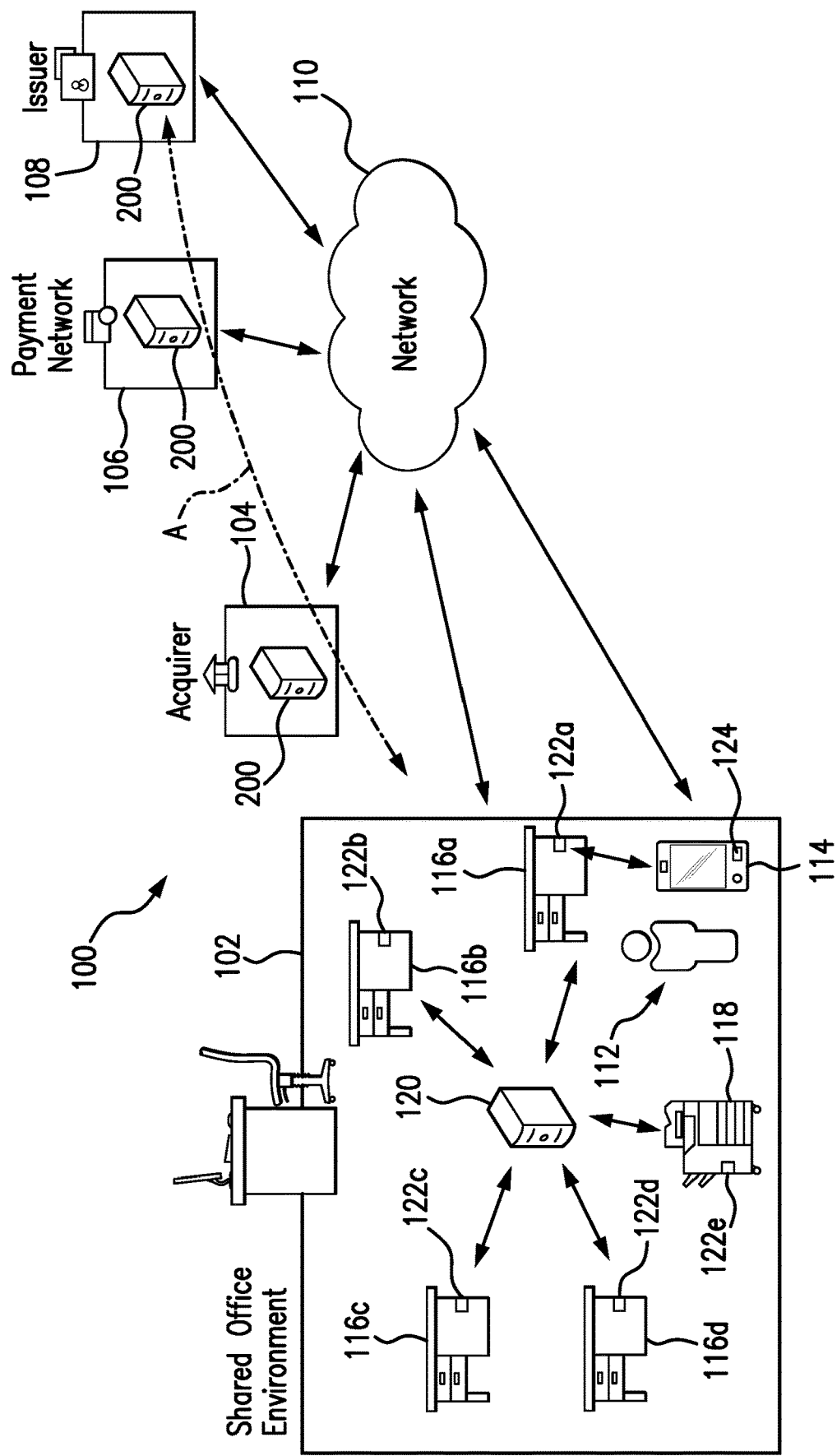
FIG. 1 is a block diagram of an exemplary system of the present disclosure suitable for use in assessing fees in connection with use of workstations at a shared office environment.

FIG. 1 illustrates an exemplary system 100, in which the one or more aspects of the present disclosure may be implemented. Although the system 100 is presented in one arrangement, other embodiments may include the parts of the system 100 (or other parts) arranged otherwise depending on, for example, the type of shared office environments implemented, the types of assets available at the shared office environments, the number of assets available at the shared office environments, etc.

In this exemplary embodiment, the system 100 includes a shared office environment 102, an acquirer 104 associated with the shared office environment 102, a payment network 106, and an issuer 108 configured to issue payment accounts (or other accounts) to users, each of which is coupled to (and is in communication with) network 110. The network 110 may include, without limitation, a local area network (LAN), a wide area network (WAN) (e.g., the Internet, etc.), a mobile network, a virtual network, and/or another suitable public and/or private network capable of supporting communication among two or more of the parts illustrated in FIG. 1, or any combination thereof. For example, network 110 may include multiple different networks, such as a private payment transaction network made accessible by the payment network 106 to the acquirer 104 and the issuer 108 and, separately, the public Internet, which may provide interconnection between the shared office environment 102, the payment network 106, and a user 112 and, in particular, a communication device 114 associated with the user 112, etc.

The shared office environment 102, as shown, includes four separate workstations 116a-d, which may include, for example, desks, cubicles, work surfaces, platforms or spaces, etc., available for use by users to accomplish one or more tasks. The workstations 116a-d may also include computing devices for use by the users, or computing devices may be omitted (where the users either do not use computing devices, or the users supply their own computing devices, etc.). What's more, the workstations 116a-d are not assigned to any one user in particular, but are available for use, in general, or upon reservation, by users of the shared office environment 102. Further, the shared office environment 102 includes, in this example, a copier 118 for use by the users. It should be appreciated that other shared office environments may include the same, different, and/or additional amenities (broadly, assets), such as, for example, facsimile machines, telephones, projectors, security devices, wireless network usage/availability, conference rooms, meeting spaces, security persons, receptionists, and/or other equipment and/or persons suitable for use and/or services in the context of the shared office environment 102. Also, while only four workstations 116a-d and one copier 118 are shown in FIG. 1, it should be appreciated that the shared office environment 102 may include a different number of workstations and/or copiers, etc. within the scope of the present disclosure.

The shared office environment 102 also includes a backend server 120 and multiple sensors 122a-e. The sensors 122a-d are associated with the respective workstations 116a-d, and the sensor 122e is associated with the copier 118. Each of the sensors 122a-e is coupled in communication with the backend server 120. With that said, it should be appreciated that the backend server 120 may be located within the shared office environment 102, as shown in FIG. 1, or it may be disposed remote therefrom in other system embodiments (and still function as described herein).

As indicated above, the user 112 (illustrated as a user of the shared office environment 102) is associated with the communication device 114. In this exemplary embodiment, the communication device 114 may include, without limitation, a smartphone, a tablet, a laptop, a personal computer, etc. Also, as shown, the communication device 114 includes an application 124, which configures the communication device 114 to operate as described herein. With that said, the communication device 114 is generally configured to perform one or more operations described herein generally in coordination with the application 124 (even if the application 124 is not specifically referenced), although this is not required in all embodiments. The user 112 is also associated with a payment account issued by the issuer 108, which is identified by one or more payment account credentials (e.g., a primary count number (PAN), a token, an expiration date, a card verification code (CVC), etc.).

While only one shared office environment 102, one acquirer 104, one payment network 106, one issuer 108, one user 112, and one communication device 114 are illustrated in FIG. 1, it should be appreciated that any number of these parts may be included in the system 100, or may be included as a part of systems in other embodiments, consistent with the present disclosure.

Figure 2:
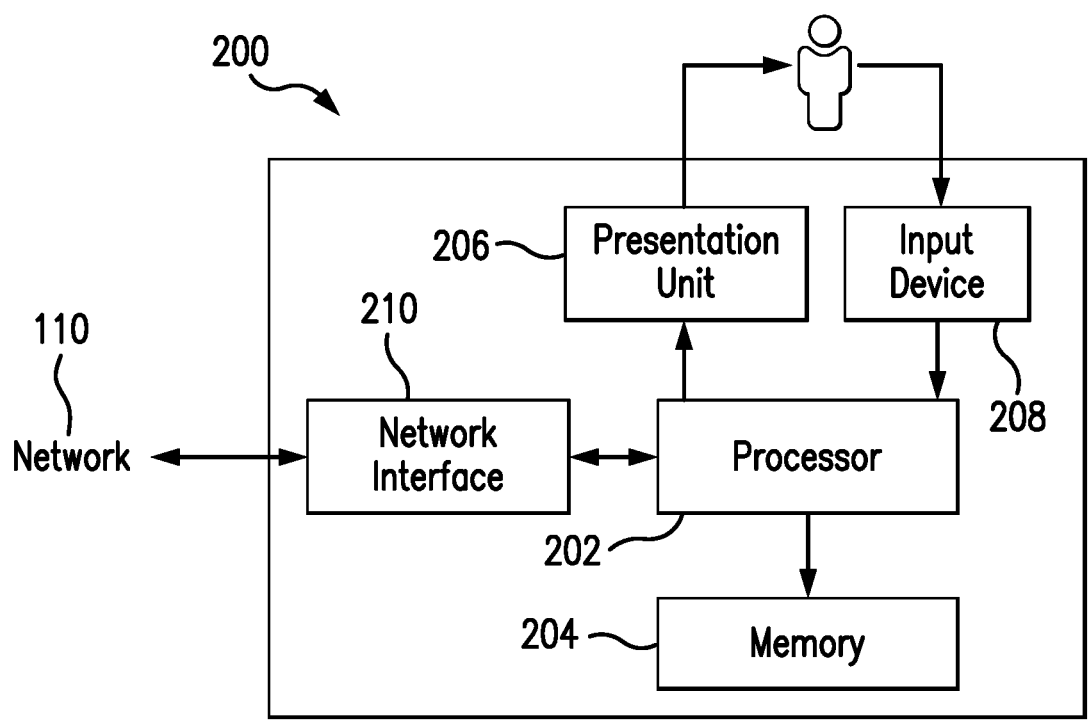
FIG. 2 is a block diagram of a computing device that may be used in the exemplary system of FIG. 1.

FIG. 2 illustrates an exemplary computing device 200 that can be used in the system 100. The computing device 200 may include, for example, one or more servers, workstations, personal computers, laptops, tablets, smartphones, etc. In addition, the computing device 200 may include a single computing device, or it may include multiple computing devices located in close proximity or distributed over a geographic region, so long as the computing devices are specifically configured to function as described herein. In the exemplary embodiment of FIG. 1, each of the acquirer 104, the payment network 106, and the issuer 108 are illustrated as including, or being implemented in, computing device 200, coupled to (and in communication with) the network 110. In addition, the communication device 114 associated with the user 112 can also be considered a computing device consistent with computing device 200 for purposes of the description herein. Further, each of the backend server 120 and the sensors 122a-e at the shared office environment 102 may be considered as including and/or being implemented in at least one computing device generally consistent with computing device 200 (e.g., potentially with output device(s) and/or input device(s) being omitted, etc.). With that said, the system 100 should not be considered to be limited to the computing device 200, as described below, as different computing devices and/or arrangements of computing devices may be used. In addition, different components and/or arrangements of components may be used in other computing devices.

Referring to FIG. 2, the exemplary computing device 200 includes a processor 202 and a memory 204 coupled to (and in communication with) the processor 202. The processor 202 may include one or more processing units (e.g., in a multi-core configuration, etc.). For example, the processor 202 may include, without limitation, a central processing unit (CPU), a microcontroller, a reduced instruction set computer (RISC) processor, an application specific integrated circuit (ASIC), a programmable logic device (PLD), a gate array, and/or any other circuit or processor capable of the functions described herein.

The memory 204, as described herein, is one or more devices that permit data, instructions, etc., to be stored therein and retrieved therefrom. The memory 204 may include one or more computer-readable storage media, such as, without limitation, dynamic random access memory (DRAM), static random access memory (SRAM), read only memory (ROM), erasable programmable read only memory (EPROM), solid state devices, flash drives, CD-ROMs, thumb drives, floppy disks, tapes, hard disks, and/or any other type of volatile or nonvolatile physical or tangible computer-readable media. The memory 204 may be configured to store, without limitation, transaction data, occupancy data such as occupancy intervals, fee factors, rates, calculated fees, departure intervals, user profiles, and/or other types of data (and/or data structures) suitable for use as described herein. Furthermore, in various embodiments, computer-executable instructions may be stored in the memory 204 for execution by the processor 202 to cause the processor 202 to perform one or more of the functions described herein, such that the memory 204 is a physical, tangible, and non-transitory computer readable storage media. Such instructions often improve the efficiencies and/or performance of the processor 202 and/or other computer system components configured to perform one or more of the various operations herein. It should be appreciated that the memory 204 may include a variety of different memories, each implemented in one or more of the functions or processes described herein.

In the exemplary embodiment, the computing device 200 also includes a presentation unit 206 that is coupled to (and in communication with) the processor 202 (however, it should be appreciated that the computing device 200 could include output devices other than the presentation unit 206, etc.). The presentation unit 206 outputs information (e.g., notifications, etc.), visually, for example, to a user of the computing device 200, such as the user 112, etc. And, various interfaces (e.g., as defined by network-based applications, etc.) may be displayed at computing device 200, and in particular, at presentation unit 206, to display certain information. The presentation unit 206 may include, without limitation, a liquid crystal display (LCD), a light-emitting diode (LED) display, an organic LED (OLED) display, an "electronic ink" display, speakers, etc. In some embodiments, presentation unit 206 includes multiple devices.

In addition, the computing device 200 includes an input device 208 that receives inputs from the user of the computing device 200 (i.e., user inputs) such as, for example, inputs by the user 112 to the communication device 114, as further described below. The input device 208 may include a single input device or multiple input devices. The input device 208 is coupled to (and is in communication with) the processor 202 and may include, for example, one or more of a keyboard, a pointing device, a mouse, a stylus, a camera, a proximity sensor, a position or movement sensor, an infrared sensor, a weight sensor, a pressure sensor, another computing device, and/or an audio input device. Further, in various exemplary embodiments, a touch screen, such as that included in a tablet, a smartphone, or similar device, behaves as both a presentation unit and an input device.

Further, the illustrated computing device 200 also includes a network interface 210 coupled to (and in communication with) the processor 202 and the memory 204. The network interface 210 may include, without limitation, a wired network adapter, a wireless network adapter (e.g., a near field communication (NFC™) adapter, a Bluetooth™ adapter, a ZigBee™ adapter, etc.), a mobile network adapter, or other device capable of communicating to one or more different networks, including the network. Further, in some exemplary embodiments, the computing device 200 includes the processor 202 and one or more network interfaces incorporated into or with the processor 202. In at least one embodiment, the network interfaces 210 may further be considered an input device 208, when the network interface 210 detects the presence of a computing device, etc.

Referring again to FIG. 1, when the user 112 expects and/or desires to enter, access, and/or utilize the shared office environment 102, the user downloads and installs the application 124 to the communication device 114. Once installed, the user 112 registers with the application 124. The application may be provided by any one or more parts of the system 100 (e.g., the shared office environment 102, the payment network 106, etc.), or not, as desired.

In particular, the communication device 114 is configured, by the installed application 124, to solicit certain personal information from the user 112, including, for example, a name, an address, contact information, a date of birth, a facial image, a fingerprint, etc. In addition, the communication device 114 is configured, by the installed application 124, to solicit a payment account credential for the payment account associated with the user 112. In response, the user 112 provides the personal information and one or more credentials (e.g., the PAN for his/her payment account, the token, the expiration date, the CVC, etc.). Upon receipt of the information and credential(s), the communication device 114 is configured, by the installed application 124, to compile and store a user profile for the user 112, whereupon the user 112 is registered. The communication device 114 may be configured, by the application 124, to further solicit a username and/or password, or other authentication credential(s) from the user 112 (e.g., a facial image, a fingerprint, etc. for use in authenticating the user 112 to the application 124; etc.), to permit the user 112 to access and/or change information (e.g., including payment account credentials, etc.) included in the user profile. In addition, as part of registering the user 112 and his/her communication device 114, the communication device 114 may be further configured, by the installed application 124, to capture and store an application identifier (ID) for the application 124 and/or an electronic serial number (ESN), a media access control (MAC) address, or other suitable identifier of the communication device 114 and/or the application 124, etc. as part of the user profile.

In various embodiments, the backend server 120 may also be associated with the application 124, such that the backend server 120 cooperates with and/or performs certain operations associated with the application 124. Specifically, for example, the communication device 114 may be configured, by the installed application 124, to cause the communication device 114 to solicit the above information from the user 112, but the backend server 120 may ultimately compile and store the user profile, and provide access thereto.

In addition, the backend server 120 is configured to communicate with the sensors 122a-e to share one or more aspects of the user profile (e.g., the application ID for the application 124 and/or the ESN, the MAC address, or other suitable identifier of the communication device 114 and/or the application 124, etc.) for use by the sensors 122a-e in detecting the communication device 114 when present at the shared office environment 102 and/or in transmitting data thereto and/or receiving data therefrom.

Once registered, the communication device 114 is configured, by the application 124, to interact with one or more of the sensors 122a-e, when present at the shared office environment 102 (e.g., when the user 112 occupies one of the workstations 116a-d associated with the sensors 122a-d, etc.). In particular, when the user 112 enters the shared office environment 102 and sits down at (or stands at) the workstation 116a, the associated sensor 122a is configured to detect the communication device 114 (e.g., by application ID, Bluetooth™ address (or BD_ADDR), NFC™ tag, etc.) (or by infrared technology associated with the communication device 114 and/or the user 112, etc.). The sensor 122a, for example, is configured to transmit a confirmation to the communication device 114 indicating the user's presence at the workstation 116a (and potentially a time thereof, etc.). In addition, the sensor 122a may be configured to provide a similar confirmation to the backend server 120 (e.g., if not relayed by the application 124, etc.). Then, when the user 112 departs the workstation 116*a,* for example, the sensor 122*a* is configured to detect the departure of the user 112, and to transmit an occupancy interval (and/or a confirmation of the departure) to the communication device 114. The occupancy interval is generally the interval between detection of the initial presence of the user 112 at the workstation 116*a* up to the detection of the departure of the user 112 from the workstation 116*a.*

It should be appreciated that the sensors 122*a-e* may further be configured to apply (or otherwise use or calculate) a departure interval for the user when at the shared office environment 102, so that when the user 112 goes to the restroom or visits the vending machine, an actual departure is not detected. Specifically, for example, the sensors 122*a-e* may be configured to detect departure of the user (as described above) but wait for the departure interval (e.g., two minutes, five minutes, ten minutes, etc.) to be satisfied (i.e., without further detecting the communication device 114 again) before reporting and/or otherwise notifying the communication device 114 and/or the backend server 120 of the user's departure. In various embodiments, the departure interval may include a predefined time set by the shared office environment 102, for example. In other embodiments, though, the departure interval may be provided by the user 112, for example, through his/her user profile, upon detected presence at the workstation 116*a* (e.g., as provided in response to receiving confirmation from the sensor 122*a* that the user 112 is present at the workstation 116*a,* etc.), etc.

Then in the system 100, in the above example, upon receipt of the occupancy interval from the sensor 122*a* (indicating that the user has departed the workstation 116*a*), the communication device 114 is configured, by the application 124, to calculate a fee associated with occupancy of the workstation 116*a,* by the user 112, based on the occupancy interval. In turn, the communication device 114 is configured, by the application 124, to initiate a payment account transaction for the calculated fee (generally without input from the user 112), which is generally specific to the occupancy of the workstation 116*a* by the user 112 and also substantially facilitated upon the departure of the user 112 from the workstation 116*a.*

In one exemplary transaction, the communication device 114, as configured by the office application 124, instructs the backend server 120 to charge the user's payment account (as included in the profile for the user 112) for the calculated fee. In turn, the backend server 120 (broadly, the shared office environment 102) is configured to compile an authorization message (e.g., an authorization request, etc.) for the transaction. The authorization message may include, for example, the PAN for the consumer's payment account and a transaction amount (e.g., the calculated fee, etc.), etc. The shared office environment 102 transmits the authorization message to the acquirer 104, which in turn communicates the authorization message with the issuer 108, generally along path A in FIG. 1, through the payment network 106 (via the network 110), for authorization of the transaction. The issuer 108 then determines if the consumer's payment account is in good standing and if sufficient credit/funds to complete the transaction is associated with the payment account. In this example, if the issuer 108 approves/accepts the transaction, another authorization message (and, more specifically, an authorization reply) is provided back to the shared office environment 102 (along path A) authorizing the transaction, and the shared office environment 102 completes the transaction. The credit line or funds associated with the consumer's payment account, depending on the type of payment account, is then decreased by the amount of the transaction/payment, and the charge is posted to the payment account. The transaction is later cleared and settled by and between the shared office environment 102 and the acquirer 104 (in accordance with a settlement arrangement, etc.), and by and between the acquirer 104 and the issuer 108 (in accordance with another settlement arrangement, etc.).

It should be understood that while the communication device 114 and/or the application 124 initiates the transaction in the above exemplary embodiment, the shared office environment 102 (and, specifically, the backend server 120) may instead initiate the transaction (generally independent of the application 124), based on one or more confirmations and/or notifications from the sensors 122*a-e,* in other exemplary applications. Also, the above description generally includes a credit and/or debit transaction. That said, in other examples, when the transactions are initiated, by the application 124, or by the shared office environment 102, the transactions may instead include automated clearing house (ACH) transactions.

In addition to above, the backend server 120 is configured to determine a total occupancy of the workstations 116*a-d,* or of the shared office environment 102 (e.g., continuously, at defined intervals, periodically, randomly, etc.). Specifically, in this exemplary embodiment, the backend server 120 is configured to compile historical data related to the total occupancy of the workstations 116*a-d* at the shared office environment 102, and to assign occupancy levels for different times and/or dates. For example, Mondays between 9:00 am and 2:30 pm may be high occupancy periods and thus assigned high occupancy levels, while Fridays may be medium occupancy times (and thus assigned medium occupancy levels) and Saturdays, after 3:00 pm, may be low occupancy periods (and thus assigned low occupancy levels). The level of occupancy, then, may be considered in setting one or more fee factors for the given periods, which may be employed by the application 124 and/or the backend server 120 to calculate the fee for the user 112 during the given occupancy interval. That is, a higher fee rate may apply when the occupancy interval for the user 112 overlaps a high occupancy period (e.g., a surge charge may be applied, etc.), while a lower fee may apply when the occupancy interval for the user 112 overlaps a low occupancy period. This fee factor and other fee factors are described in more detail below (as part of providing metered usage of the workstation 116*a* at the shared office environment 102, etc.).

In one or more embodiments, the above use of the sensors 122*a-e* at the shared office environment 102 may be altered and/or omitted.

In particular, for example, the shared office environment 102 may include an internal network comprising multiple computing devices (e.g., multiple Wi-Fi routers, Bluetooth™ devices, etc.), which may be configured to interact with the sensors 122*a-e* and/or the user's communication device 114 to detect the location of the communication device 114 at one of the workstations 116*a-d* and/or at the copier 118. In connection therewith, for example, the communication device 114 may be configured (e.g., via the application 124, or via another suitable network-based application, or executable instructions therein, etc.) triangulate and/or calculate its position within the shared office environment 102 based on interactions with the multiple computing devices (e.g., based on signal strength to/from the multiple computing devices (e.g., Bluetooth™, IEEE 802.11, etc.), etc.) and reference locations of the internal network computing devices and the workstations 116a-d (and the copier 118) within the shared office environment 102.

FIG. 3 illustrates an exemplary method 300 for use in assessing fees to a user for use of an asset by the user (e.g., a workstation at a shared office environment, etc.), and for use in facilitating a payment account transaction for such use. The exemplary method 300 is generally described with reference to the system 100 and the computing device 200. However, the methods herein should not be understood to be limited to the system 100 or the computing device 200, as the methods may be implemented in other systems and/or computing devices. Likewise, the systems and the computing devices herein should not be understood to be limited to the exemplary method 300.

In general in the method 300, the user 112 is registered to the shared office environment 102, and includes the application 124 installed and active in his/her communication device 114. It should be appreciated, however, that operations relating to registration of the user 112 to the shared office environment 102 and/or installation of the application 124 to the user's communication device 114 (as generally described above in connection with the system 100) may be included in other method embodiments.

As shown in FIG. 3, when the user 112 enters the shared office environment 102 and sits or stands at (or otherwise occupies) the workstation 116a, for example, the sensor 122a detects, at 302, the presence of the communication device 114 at the workstation 116a. In particular, for example, the sensor 122a includes a network interface 210, which communicates with the network interface 210 of the communication device 114, via Bluetooth™, ZigBee™, NFC™, IEEE 802.11, cellular, etc., whereby the sensor 122a detects the application ID, MAC address, and/or tag of the application 124 and/or communication device 114, etc. In one or more embodiments, where the sensor 122a includes an NFC™ sensor, the sensor 122a may detect the presence of the communication device 114 at the workstation 116a in response to a tap, contact, and/or proximity of the communication device 114 with/to the sensor 122a. In addition, or alternatively, in detecting the presence of the communication device 114, the sensor 122a may include one or more sensors, such as, for example, an infrared sensor, a position sensor, or a combination thereof, which detects the presence of the communication device 114 by detecting the communication device 114 and/or the user 112. In any case, upon detection of the communication device 114, the sensor 122a transmits confirmation of the presence of the communication device 114 at the workstation 116a, at 304, to the communication device 114. In addition, but not shown in FIG. 3, the sensor 122a further transmits the confirmation of the communication device 114 at the workstation 116a to the backend server 120. Either confirmation may include, for example, a sensor ID for the sensor 122a, a communication device ID for the communication device 114 (e.g., MAC address, ESN, app ID, etc.), a time and date of the detected presence, a shared office environment identifier for the shared office environment 102 and/or for the workstation 116a, etc. The communication device 114 and backend server 120, in turn, store the confirmation in memory (e.g., the memory 204, etc.).

Thereafter, the user 112 begins to utilize and/or continues to utilize the workstation 116a, for example, to perform one or more tasks, etc.

When the user 112 departs the workstation 116, to visit the restroom, for example, the sensor 122a detects, at 306, the departure of the communication device 114 from the workstation 116a, as described above with reference to detecting the presence of the communication device 114 at the workstation 116a (e.g., in a similar manner, etc.). The sensor 122a then determines, at 308, if a length of the departure satisfies a departure interval, which may be, for example, three minutes, five minutes, ten minutes, or some other interval, etc. In one example, where the departure interval is four minutes, and the user 112 returns to the workstation 116a three minutes after his/her departure from the workstation 116, the sensor 122a will determine that the departure interval is not satisfied, at 308, and then ignore the detected departure.

Conversely, if the user 112 leaves the shared office environment 102, for example, or otherwise leaves the workstation 116a and does not return within four minutes (in the example above), the sensor 122a determines the departure satisfies the departure interval, at 308, and transmits an occupancy interval to the communication device 114, at 310. It should be appreciated that, rather than transmitting the occupancy interval, in some embodiments, the sensor 122a may transmit the departure time for the user 112 to the communication device 114, whereupon the communication device 114 would be able to determine the occupancy interval based on the previously received confirmation of the presence of the user 112 at the workstation 116a (as received from the sensor 122a, at 304), etc.

In at least one embodiment, a different one of the sensors 122b-e may be employed in connection with the departure interval. For example, when the user 112 has departed the workstation 116a for eight minutes, but spent those eight minutes at the copier 118 making copies or at the workstation 116c (working with another user), the sensor 122e or the sensor 122c may detect the user 112 and transmit a confirmation of the presence of the user 112 to the backend server 120, which in turn, relays the confirmation to the sensor 122a. Thus, prior to determining if the departure interval is satisfied (at 308), the sensor 122a may rely on confirmation of presence of the user 112 at the shared office environment 102, in general, from the backend server 120 (or the other sensors 122b-e) in order to determine if the user 112 is accounted for elsewhere in the shared office environment 102.

Apart from the user 112, at various times other users have occupied the workstation 116a and also the workstations 116b-d, as detected by sensors 122a-e. For each detected presence and each detected departure (which satisfies the given departure interval for the users), the backend server 120 receives confirmations and occupancy intervals directly from the sensors 122a-e, or indirectly via the communication devices associated with such users (or a transaction initiated thereby). The backend server 120 then determines historical occupancy of one or more of the workstations 116a-d, based on the presences and departures of the users for the workstations 116a-d (over a historical interval (e.g., a last thirty days, a last three months, a last six months, a last year, etc.)). The historical occupancy may include different types of periods, for example, high occupancy periods, medium occupancy periods, low occupancy periods, etc. The periods may be determined based, simply, on counts per historical interval, or otherwise. Table 1 includes an exemplary compilation of the historical occupancy (i.e., a compilation of the number of occupants) of the workstations 116a-d and other workstations (not shown) at the shared office environment 102 for the last six months.

TABLE 1

|  | Morning 6-9am | Mid-Morning 9-11am | Midday 11am-2pm | Afternoon 2-5pm | Evening 5-8pm | Late 8-11pm | Late night 11pm-3am | Early Morning 3-6am |
|---|---|---|---|---|---|---|---|---|
| Monday | 3 | 5 | 7 | 7 | 5 | 4 | 2 | 0 |
| Tuesday | 5 | 7 | 8 | 9 | 8 | 6 | 3 | 1 |
| Wednesday | 5 | 9 | 10 | 12 | 10 | 6 | 4 | 2 |
| Thursday | 4 | 12 | 11 | 10 | 11 | 5 | 3 | 1 |
| Friday | 3 | 7 | 10 | 6 | 7 | 3 | 2 | 1 |
| Saturday | 0 | 3 | 4 | 2 | 2 | 1 | 1 | 0 |
| Sunday | 0 | 1 | 3 | 3 | 0 | 0 | 1 | 0 |

In Table 1, in one example, thresholds of 12 and 3, respectively, are applied between high-medium occupancy periods and between medium-low occupancy periods. In particular, an occupancy of 12 and above (as a first threshold) is determined to be a high occupancy period and an occupancy of 3 and below (as a second threshold) is determined to be a low occupancy period (with occupancy of between 3 and 12 then determined to be a medium occupancy period). As such, the mid-morning on Thursday is a high occupancy period, while late on Friday is a low occupancy period. In this example, then, the type of the occupancy period during which the user 112 is present at the workstation 116a may be used to identify a fee factor (or multiple fee factors) for use in calculating the user's fee for usage of the workstation 116. Example fee factors for the high, medium, and low time periods described above are illustrated in Table 2.

TABLE 2

| Period Type | Fee Factor |
|---|---|
| High | Add 6% |
| Medium | Standard |
| Low | Subtract 3% |

The fee factor(s) is/are stored in memory (e.g., the memory 204, etc.) in the backend server 120 (after being determined and/or calculated) by the backend server 120. It should be understood that the fee factor(s) described herein and provided in Table 2 are simplified for purposes of illustration. It should also be appreciated that the fee factor(s) may be specific by one hour periods, for specific days of the week (e.g., Add 1% for 2:00-3:00 pm on Thursdays, etc.), or may be more general (e.g., like in Tables 1 and 2, etc.), with an interval of a couple hours, or multiple hours or days or weeks, or more or less, etc. What's more, the compilation of the occupancies at the workstations 116a-d and other workstations (not shown) at the shared office environment 102 may be accomplished otherwise. In one example, the compilation may be based on a count of users within the shared office environment 102, apart from, or in addition to, the actual workstation occupancy, whereby the count of users provide a varied impression of the occupancy of the shared office environment 102 (or how busy the shared office environment 102 is), especially when not every user within the shared office environment 102 is occupying a workstation or is otherwise associated with and/or in use of an amenity of the shared office environment 102.

With continued reference to FIG. 3, once the communication device 114 receives the occupancy interval from the sensor 122a (or determines the occupancy interval itself), the communication device 114 retrieves, at 312, one or more fee factors from the backend server 120, if applicable, for use in calculating a fee for the occupancy interval. Optionally in method 300, as indicated by the dotted lines, the sensor 122a (and/or backend server 120) may transmit, at 314, the fee factor(s) to the communication device 114, as compared to the communication device 114 retrieving the fee factor(s) (as configured by the application 124).

Subsequently, the communication device 114 calculates, at 316, the fee for the use of the workstation 116a based on the occupancy interval and, as applicable, the one or more fee factors. In one example, a fee factor based on the relative occupancy of the workstations 116a-d and/or other workstations is omitted, whereby the communication device 114 (as configured by the application 124) calculates the fee as a rate times the occupancy interval (e.g., $5.64/hour×3.5 hours=$19.74; etc.). In another example, where a fee factor is applicable, the communication device 114 may calculate the fee as a rate times the occupancy interval times the fee factor(s) (e.g., $5.64/hour×3.5 hours×1.06=$20.92; etc.). It should be appreciated that fees may be calculated in other manners based on different algorithms and/or fee factors suitable to a particular method embodiment.

In addition to the fee, for the occupancy interval, other fees may be calculated and/or included with the fee for the occupancy interval. For example, when the user 112 uses the copier 118 to make copies, within the occupancy interval, the sensor 122e detects the communication device 114, as described above, and further communicates with the copier 118 to determine a number of the copies, a type of the copies, etc., whereupon the sensor 122e transmits the same to the communication device 114 and/or the backend server 120, so that the assessed fee for use of the copier 118 may be included along with the fee for the occupancy interval. In another example, the shared office environment 102 may offer access to a wireless network as an amenity for users. When the user 112 logs into the wireless network within the occupancy interval, and begins to work, data usage associated with the communication device 114 may be tracked, for example, by the backend server 120. As above, a fee may then be assessed for use of the wireless network, in general, or by usage, which is then included along with the fee for the occupancy interval (and/or copier, etc.). It should be understood that other sensors (not shown in FIG. 1) may be employed to detect and/or determine a usage, by the user 112, of other amenities at the shared office environment 102 (e.g., facsimile machines, telephones, meeting spaces, conference rooms, etc.).

Then in the method 300, once the fee(s) is(are) calculated (regardless of content), the communication device 114, via the application 124, initiates a payment account transaction for the fee(s), at 318, (e.g., occupancy fees, assessed fees, other fees, etc.). Specifically, the communication device 114, as configured by the application 124, communicates a transaction request to the backend server 120, which, in turn, compiles and submits an authorization message to the acquirer 104, for authorization, clearing and settlement as described above. In at least one embodiment, to initiate the transaction, the communication device 114, as configured by the application 124, may compile and transmit the authorization message to the acquirer 104 for authorization, clearing and settlement as described above. Regardless of whether the communication device 114 or the backend server 120 compiles and transmits the authorization message, the transaction is initiated substantially upon departure of the user 112 from the workstation 116 and/or the shared office environment 102 (e.g., within two minutes, five minutes, thirty minutes, etc., of the departure and/or satisfaction of the departure interval, etc.).

While the sensors 122a-e are described herein with reference to usage of various parts of the shared office environment 102, by the user 112, it should be appreciated that the sensors 122a-e or other sensors may further be employed to enable other features associated with the shared office environment 102. For example, a sensor may be employed to detect the presence of the user 112 and provide access to (and/or power to) the shared office environment 102, a conference room, a workstation, a copier, a facsimile machine, etc. What's more, in some embodiments, this may further require the user 112 to access the application 124 at his/her communication device 114 (via appropriate authentication, for example, by providing a PIN, a biometric, etc.).

In view of the above, the systems and methods herein provide for at least metered use of workstations at shared office environments. By charging the users for time spent occupying the workstations of the shared office environment, rather than for memberships and/or subscriptions, the users are able to pay for actual utilization of the workstation, thereby providing value, while the shared office environment is able to adjust rates (e.g., by fee factors, etc.) to charge appropriately for high occupancy times, and further to encourage occupancy during historically low occupancy times (e.g., again, by fee factors, etc.). What's more, as appreciated from the above, the systems and methods herein provide for occupancy of the workstations and payment for that occupancy with reduced or no interaction and/or input from the user, as he/she occupies the workstation, departs the workstation, etc. The sensors and/or the application permit the operations described herein to be anonymous and/or unknown, essentially, to the user (after registration) as he/she accomplishes tasks through use of the shared office environment. The systems and methods herein further provides sensors, for use in determining other usage by the users at the shared office environment, for purposes of charging the user, again, for what the user utilizes and not a flat and/or generic subscription or membership fee. In general, the fees associated with the shared office environment are "unbundled" with the user paying only for actual usage.

Again and as previously described, it should be appreciated that the functions described herein, in some embodiments, may be described in computer executable instructions stored on a computer readable media, and executable by one or more processors. The computer readable media is a non-transitory computer readable storage medium. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

It should also be appreciated that one or more aspects of the present disclosure transform a general-purpose computing device into a special-purpose computing device when configured to perform the functions, methods, and/or processes described herein.

As will be appreciated, based on the foregoing specification, the above-described embodiments of the disclosure may be implemented using computer programming or engineering techniques, including computer software, firmware, hardware or any combination or subset thereof, wherein the technical effect may be achieved by performing at least one of the following operations: (a) receiving, at a computing device, from a sensor associated with a workstation, confirmation of a presence of a user at the workstation; (b) receiving, at the computing device, from the sensor associated with the workstation, an occupancy interval at the workstation based on the presence of the user at the workstation up to a departure of the user from the workstation; (c) in response to receiving the occupancy interval, determining, by the computing device, a fee associated with occupancy of the workstation, by the user, based on at least the occupancy interval; and (d) initiating a transaction, to a payment account associated with the user, for the determined fee, thereby providing payment specific to the occupancy of the workstation by the user substantially upon the departure of the user from the workstation.

Exemplary embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular exemplary embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When a feature is referred to as being "on," "engaged to," "connected to," "coupled to," "associated with," "included with," or "in communication with" another feature, it may be directly on, engaged, connected, coupled, associated, included, or in communication to or with the other feature, or intervening features may be present. As used herein, the term "and/or" includes any and all combinations of one or more of the associated listed items.

Although the terms first, second, third, etc. may be used herein to describe various features, these features should not be limited by these terms. These terms may be only used to distinguish one feature from another. Terms such as "first," "second," and other numerical terms when used herein do not imply a sequence or order unless clearly indicated by the context. Thus, a first feature discussed herein could be termed a second feature without departing from the teachings of the example embodiments.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

The foregoing description of exemplary embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method for use in assessing one or more fees in connection with occupancy at a shared office environment, the method comprising:
    receiving, at a computing device, via a sensor associated with a shared workstation, confirmation of a presence of a communication device associated with a user at the shared workstation, based on an identifier associated with the communication device detected by the sensor;
    receiving, at the computing device, via the sensor associated with the shared workstation, an occupancy interval at the shared workstation based on the presence of the user at the shared workstation up to a departure of the user from the shared workstation, based on the identifier associated with the communication device detected by the sensor;
    in response to receiving the occupancy interval:
        determining, by the computing device, a fee associated with occupancy of the shared workstation, by the user, based on at least the occupancy interval for the shared workstation; and
        automatically initiating a transaction, to a payment account associated with the user, for the determined fee, thereby providing payment specific to the occupancy of the shared workstation by the user substantially upon the departure of the user from the shared workstation.

2. The computer-implemented method of claim 1, wherein said shared workstation is disposed at a premises associated with the shared office environment with multiple other shared workstations; and
    wherein determining the fee associated with the occupancy of said shared workstation is further based on at least one fee factor related to historical occupancy of the shared workstation and the multiple other shared workstations.

3. The computer-implemented method of claim 2, wherein the at least one fee factor includes a first fee factor associated with a first period and a second fee factor associated with a second period; and
    wherein determining the fee associated with the occupancy of said shared workstation includes determining the fee based on the first fee factor for a part of the occupancy interval overlapping the first period and based on the second fee factor for another part of the occupancy interval overlapping the second period.

4. The computer-implemented method of claim 2, wherein the at least one fee factor is associated with one of a low occupancy period and a high occupancy period; and
    wherein determining the fee associated with the occupancy of said shared workstation is further based on the at least one fee factor when the occupancy interval at least partially overlaps the one of the low occupancy period and the high occupancy period.

5. The computer-implemented method of claim 4, wherein the at least one fee factor is specific to a day of a week and at least a one hour period of the day.

6. The computer-implemented method of claim 1, further comprising transmitting at least one of the confirmation and the occupancy interval to a backend server associated with the shared workstation.

7. The computer-implemented method of claim 1, wherein initiating the transaction includes transmitting a transaction request to a backend server associated with the shared office environment.

8. The computer-implemented method of claim 7, wherein a transaction amount for the transaction includes the determined fee and at least one other fee related to an amenity at the shared office environment.

9. A system for assessing one or more fees in connection with occupancy at a shared office environment, the system comprising
    a shared workstation including a work surface for use by a user;
    a sensor coupled to the shared workstation, the sensor configured to:
        detect a presence of a communication device associated with the user at the shared workstation, based on an identifier associated with the communication device;
        detect a departure of the user from the shared workstation based on the identifier associated with the communication device;
        determine an occupancy interval between the presence of the communication device at the shared workstation and the departure of the communication device from the shared workstation; and
        in response to the occupancy interval exceeding a threshold, transmit, to the communication device, at least one of a confirmation of the presence of the communication device at the shared workstation and the occupancy interval for the communication device at the shared workstation; and
    a computer-readable storage media including executable instructions, which, when executed by the communication device, cause the communication device to:
        receive the at least one of the confirmation of the presence of the communication device at the shared workstation and the occupancy interval for the communication device at the shared workstation;
        calculate a fee based on the at least one of the received confirmation of the presence of the communication device at the shared workstation and the received occupancy interval for the communication device at the shared workstation; and
        initiate a transaction for at least the calculated fee to a payment account associated with the user substantially upon the departure of the user from the shared workstation, the transaction being specific to an occupancy of the user at the shared workstation.

10. The system of claim 9, further comprising the communication device; and wherein the computer-readable storage media is included at the communication device.

11. The system of claim 9, further comprising a backend server in communication with the sensor, the backend server configured to determine a historical occupancy of at least the shared workstation and to assign a fee factor to the shared workstation based on the historic occupancy; and
    wherein the executable instructions, when executed by the communication device, cause the communication device to calculate the fee further based on the fee factor for said shared workstation.

12. The system of claim 11, further comprising multiple other shared workstations at the shared office environment and multiple other sensors, each associated with one of the multiple other shared workstations;
    wherein each of the sensor and the multiple other sensors are configured to transmit a notification to the backend server of at least one of a presence of a user at one of the multiple shared workstations, a departure of a user from one of the multiple shared workstations and an occupancy interval of a user, for each of the associated shared workstations during a historical interval; and
    wherein the backend server is configured to, based on the notification(s) from the sensors during the historical interval, determine the historical occupancy of the shared workstation and the multiple other shared workstations.

13. The system of claim 11, wherein the executable instructions, when executed by the communication device, cause the communication device to retrieve the fee factor for the shared workstation from the backend server, prior to calculating the fee.

14. The system of claim 11, wherein the executable instructions, when executed by the communication device, cause the communication device, in order to initiate the transaction, to transmit a transaction request to the backend server; and
    wherein the backend server, in response to the transaction request, is configured to compile and transmit an authorization request to an acquirer associated with the shared office environment.

15. The system of claim 14, wherein the backend server is configured to assess a fee associated with an amenity of the shared office environment utilized by the user during the occupancy interval; and
    wherein the authorization request includes an amount including at least the assessed fee and the calculated fee.

16. The system of claim 9, wherein the executable instructions, when executed by the communication device, cause the communication device to calculate the fee based on the occupancy interval for the communication device at the shared workstation and at least one fee factor associated with at least one of a low occupancy period and a high occupancy period for the shared workstation, when the occupancy period at least partially overlaps at least one of the low occupancy period and the high occupancy period.

17. The system of claim 9, wherein the identifier of the communication device includes one of an electronic serial number (ESN) and an application identifier (ID) associated with the communication device.

* * * * *